US012768535B2

(12) United States Patent
Seeley et al.

(10) Patent No.: US 12,768,535 B2
(45) Date of Patent: Oct. 20, 2026

(54) INLET ASSEMBLY

(71) Applicant: Edwards Limited, Burgess Hill (GB)

(72) Inventors: Andrew James Seeley, Clevedon (GB); Michael Jay Silberstein, San Jose, CA (US)

(73) Assignee: Edwards Limited, Burgess Hill (GB)

( * ) Notice: Subject to any disclaimer, the term of this patent is extended or adjusted under 35 U.S.C. 154(b) by 395 days.

(21) Appl. No.: 18/577,523

(22) PCT Filed: Jul. 7, 2022

(86) PCT No.: PCT/GB2022/051748

§ 371 (c)(1),
(2) Date: Jan. 8, 2024

(87) PCT Pub. No.: WO2023/285782

PCT Pub. Date: Jan. 19, 2023

(65) Prior Publication Data

US 2024/0337381 A1 Oct. 10, 2024

(30) Foreign Application Priority Data

Jul. 13, 2021 (GB) ..................................... 2110052

(51) Int. Cl.
*F23G 7/06* (2006.01)
*B01D 53/70* (2006.01)

(52) U.S. Cl.
CPC ............. *F23G 7/065* (2013.01); *B01D 53/70* (2013.01); *B01D 2258/0216* (2013.01); *F23G 2209/14* (2013.01)

(58) Field of Classification Search
CPC ................................ F23D 14/58; F23G 7/065
USPC ...................................................... 431/187, 5
See application file for complete search history.

(56) References Cited

U.S. PATENT DOCUMENTS

2005/0031500 A1 2/2005 Feng
2013/0309618 A1* 11/2013 Horn ....................... F23D 14/58 431/181
2016/0076769 A1* 3/2016 Stanton ..................... F23G 7/06 431/75

(Continued)

FOREIGN PATENT DOCUMENTS

CN 1124341 A 6/1996
CN 101881454 A 11/2010

(Continued)

OTHER PUBLICATIONS

Japanese Notification of Reason for Rejection dated Feb. 3, 2025 for corresponding Japanese application Serial No. 2024-501176, 4 pages.

(Continued)

*Primary Examiner* — Vivek K Shirsat
(74) *Attorney, Agent, or Firm* — Theodore M. Magee; Westman, Champlin & Koehler, P.A.

(57) ABSTRACT

An inlet assembly includes an inlet nozzle configured to deliver an effluent stream into a combustion chamber of an abatement apparatus; and a reagent nozzle configured to deliver a reagent into the combustion chamber of the abatement apparatus, the reagent nozzle being located concentrically with respect to the inlet nozzle, the reagent nozzle being configured to deliver the reagent in different quantities at different positions around its perimeter.

14 Claims, 4 Drawing Sheets

(56) References Cited

U.S. PATENT DOCUMENTS

2019/0285272 A1 9/2019 Benzeval

FOREIGN PATENT DOCUMENTS

| | | | |
|---|---|---|---|
| JP | 2005522660 | A | 7/2005 |
| JP | 2008519959 | A | 12/2008 |
| JP | 2008541002 | A | 5/2012 |
| WO | 9934899 | A1 | 7/1999 |
| WO | 02074420 | A1 | 9/2022 |

OTHER PUBLICATIONS

British Examination Report dated Apr. 8, 2022 and Search Report dated Apr. 1, 2022 for corresponding British Application No. GB2110052.4, 10 pages.
PCT Notification of Transmittal of the International Search Report and the Written Opinion of the International Searching Authority, or the Declaration and PCT Search Report and Written Opinion dated Sep. 21, 2022 for corresponding PCT application Serial No. PCT/GB2022/051748, 11 pages.
Taiwanese Search Report dated Apr. 2, 2026 and Office Action dated Apr. 9, 2026 for corresponding Taiwanese application Serial No. 111125452, 14 pages.
Chinese Office Action dated Jun. 25, 2026 and Search Report dated Jun. 23, 2026 for corresponding Chinese application Serial No. 2022800496809, 8 pages.

* cited by examiner

INLET ASSEMBLY

CROSS-REFERENCE OF RELATED APPLICATION

This application is a Section 371 National Stage Application of International Application No. PCT/GB2022/051748, filed Jul. 7, 2022, and published as WO 2023/285782A1 on Jan. 19, 2023, the content of which is hereby incorporated by reference in its entirety and which claims priority of British Application No. 2110052.4, filed Jul. 13, 2021.

FIELD

The field of the invention relates to an inlet assembly, an abatement apparatus and a method.

BACKGROUND

Abatement apparatus, such as radiant burners or other types of abatement apparatus, are known and are typically used for treating an effluent gas stream from a manufacturing processing tool used in, for example, the semiconductor or flat panel display manufacturing industry. During such manufacturing, residual perfluorinated compounds (PFCs) and other compounds exist in the effluent gas stream pumped from the process tool. PFCs are difficult to remove from the effluent gas and their release into the environment is undesirable because they are known to have relatively high greenhouse activity.

Known radiant burners use combustion to remove the PFCs and other compounds from the effluent gas stream, such as that described in EP 0 694 735. Typically, the effluent gas stream is a nitrogen stream containing PFCs and other compounds. The effluent stream is conveyed into a combustion chamber that is laterally surrounded by the exit surface of a foraminous gas burner. In some cases treatment materials, such as fuel gas, can be mixed with the effluent gas stream before entering the combustion chamber. Fuel gas and air are simultaneously supplied to the foraminous burner to affect combustion at the exit surface. The products of combustion from the foraminous burner react with the effluent stream mixture to combust compounds in the effluent stream.

Although arrangements of abatement apparatus exist, they each have their own shortcomings. Accordingly, it is desired to provide an improved arrangement for abatement apparatus.

The discussion above is merely provided for general background information and is not intended to be used as an aid in determining the scope of the claimed subject matter. The claimed subject matter is not limited to implementations that solve any or all disadvantages noted in the background.

SUMMARY

According to a first aspect, there is provided an inlet assembly for an abatement apparatus for treating an effluent stream from a semiconductor processing tool, the inlet assembly comprising: an inlet nozzle configured to deliver the effluent stream into a combustion chamber of the abatement apparatus; and a reagent nozzle configured to deliver a reagent into the combustion chamber of the abatement apparatus, the reagent nozzle being located concentrically with respect to the inlet nozzle, the reagent nozzle being configured to deliver the reagent in different quantities at different positions around its perimeter.

The first aspect recognizes that a problem with existing abatement apparatus is that the abatement performance may not be optimal under particular operating conditions. In particular, the destruction rate efficiency under some conditions may not be as high as may be required and/or an oversupply of reagents may be required to achieve a particular destruction rate efficiency.

Accordingly, an inlet assembly is provided. The inlet assembly may be for an abatement apparatus. The abatement apparatus may be for treating an effluent stream from a semiconductor processing tool. The inlet assembly may comprise an inlet nozzle. The inlet nozzle may be configured to deliver the effluent stream into a combustion chamber of the abatement apparatus. The inlet assembly may comprise a reagent nozzle. The reagent nozzle may be configured to deliver a reagent into the combustion chamber of the abatement apparatus. The reagent nozzle may be located concentrically with respect to the inlet nozzle or located to surround the inlet nozzle. The reagent nozzle may be configured or arranged to deliver the reagent in different quantities, amounts or at different flow rates at different positions around its perimeter. In this way, the amount of reagent supplied to the combustion chamber to assist in the abatement of the effluent stream can be varied at different positions or locations around the effluent stream. This enables the flow of the reagent to be matched the flow of the effluent stream discharging from the inlet nozzle into the combustion chamber which provides the correct amount of reagent to suit the effluent stream at different locations which improves the destruction rate efficiency of the abatement apparatus without causing an oversupply of reagent.

The inlet nozzle and the reagent nozzle may be arranged or configured to deliver or convey the reagent into the combustion chamber concentrically with respect to the effluent stream. In other words, the reagent may be delivered into the combustion chamber adjacent to the effluent stream.

The inlet assembly may comprise an upstream gallery. The upstream gallery may be configured or arranged to feed or supply the perimeter of the reagent nozzle with the reagent.

The inlet nozzle and the reagent nozzle may be configured to deliver or convey the reagent into the combustion chamber. The reagent may be delivered or conveyed to surround the effluent stream being delivered or conveyed to the combustion chamber.

The reagent nozzle may be configured or arranged to deliver more of the reagent in a vicinity of a first region, part or portion of the effluent stream than in a vicinity of a second region, part or portion of the effluent stream. In other words, the reagent may be delivered at a higher flow rate in the vicinity of the first region than the flow rate in the vicinity of the second region. This provides additional reagent in the first region compared to the reagent in the second region.

The reagent nozzle may be configured or arranged to deliver or convey more of the reagent within a first portion of the reagent nozzle than within a second portion of the reagent nozzle. In other words, the reagent nozzle may deliver reagent at a higher flow rate within the first portion than the flow rate within the second portion.

The inlet nozzle may have an obround cross-section. The reagent nozzle may have an annular obround cross-section. The reagent nozzle may be configured to deliver more of the reagent within a vicinity of a circular portion of the annular obround than within a linear portion of the annular obround. In other words, the reagent nozzle may be configured to deliver reagent with a higher flow rate in the circular portion than the flow rate within the linear portion.

An inner surface of the reagent nozzle may be spaced away from an outer surface of the inlet nozzle. A clearance distance between the inner surface of the reagent nozzle and the outer surface of the inlet nozzle may differ around the perimeter to deliver the reagent in different quantities at different positions around the perimeter. In other words, the distance between the reagent nozzle and the inlet nozzle may be varied in order to deliver the reagent at different flow rates at different positions within the reagent nozzle.

The clearance distance may be greater at positions which require more of the reagent to be delivered than at positions which require less of the reagent to be delivered. In other words, the clearance distance may be varied to change the flow rate of the reagent being delivered at different locations within the reagent nozzle.

The clearance distance may be greater within a vicinity of or proximate to a circular portion of the annular obround than within a linear portion of the annular obround.

The reagent may be supplied to the reagent nozzle via apertures positioned around the perimeter which are configured to deliver the reagent in different quantities at different positions around the perimeter. Configuring the apertures around the reagent nozzle enables different flow rates of reagent to be delivered at different positions within the inlet nozzle.

The apertures may extend radially.

A size and/or a density of the apertures may differ at different positions around the perimeter.

A size and/or a density of the apertures may be greater at positions which require more of the reagent to be delivered than at positions which require less of the reagent to be delivered. In other words, by configuring the size and/or density of the apertures, a higher flow rate of the reagent can be delivered at some positions and a lower flow rate of the reagent can be delivered at other positions within the reagent nozzle.

A size and/or a density of the apertures may be greater within a vicinity of or proximate to a circular portion of the annular obround than within a linear portion of the annular obround.

The reagent may be supplied to the reagent nozzle via a porous material positioned around the perimeter. The porous material may have differing porosities to deliver the reagents in different quantities at different positions around the perimeter. In other words, by varying the porosity, the flow rate of the reagent can differ at different positions around the perimeter.

According to a second aspect, there is provided an abatement apparatus comprising the inlet assembly of the first aspect.

The abatement apparatus may comprise the features of the inlet assembly set out above.

According to a third aspect, there is provided a method, comprising: delivering an effluent stream into a combustion chamber of an abatement apparatus with an inlet nozzle; locating a reagent nozzle concentrically with respect to the inlet nozzle; and configuring the reagent nozzle configured to deliver a reagent in different quantities at different positions around its perimeter.

The method may comprise configuring the inlet nozzle and the reagent nozzle to deliver the reagent into the combustion chamber concentrically with respect to the effluent stream.

The method may comprise feeding the perimeter of the reagent nozzle with the reagent from an upstream gallery.

The method may comprise configuring the inlet nozzle and the reagent nozzle to deliver the reagent into the combustion chamber, surrounding the effluent stream.

The method may comprise configuring the reagent nozzle to deliver more of the reagent in a vicinity of a first region of the effluent stream than in a vicinity a second region of the effluent stream.

The method may comprise configuring the reagent nozzle to deliver more of the reagent within a first portion of the reagent nozzle than within a second portion of the reagent nozzle.

the inlet nozzle may have an obround cross-section and the reagent nozzle may have an annular obround cross-section and the method may comprise configuring the reagent nozzle to deliver more of the reagent within a vicinity of a circular portion of the annular obround than within a linear portion of the annular obround.

The method may comprise spacing away an inner surface of the reagent nozzle from an outer surface of the inlet nozzle and configuring a clearance distance between the inner surface of the reagent nozzle and the outer surface of the inlet nozzle to differ around the perimeter to deliver the reagent in different quantities at different positions around the perimeter.

The method may comprise configuring the clearance distance to be is greater at positions which require more of the reagent to be delivered than at positions which require less of the reagent to be delivered.

The method may comprise configuring the clearance distance to be is greater within a vicinity of a circular portion of the annular obround than within a linear portion of the annular obround.

The method may comprise supplying the reagent to the reagent nozzle via apertures positioned around the perimeter configured to deliver the reagent in different quantities at different positions around the perimeter.

The method may comprise locating the apertures to extend radially.

The method may comprise configuring at least one of a size and a density of the apertures to differ at different positions around the perimeter.

The method may comprise configuring at least one of a size and a density of the apertures to be greater at positions which require more of the reagent to be delivered than at positions which require less of the reagent to be delivered.

The method may comprise configuring at least one of a size and a density of the apertures to be greater within a vicinity of a circular portion of the annular obround than within a linear portion of the annular obround.

The method may comprise supplying the reagent to the reagent nozzle via a porous material positioned around the perimeter and configuring the porous material to have differing porosities to deliver the reagent in different quantities at different positions around the perimeter.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

The Summary is provided to introduce a selection of concepts in a simplified form that are further described in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the present invention will now be described further, with reference to the accompanying drawings, in which.

DETAILED DESCRIPTION

Before discussing embodiments in any more detail, first an overview will be provided. Some embodiments provide an arrangement where an effluent stream nozzle which delivers an effluent stream into a combustion chamber of an abatement apparatus is provided with a co-located reagent nozzle which delivers a reagent into the combustion chamber to assist in the abatement of the effluent stream. The reagent nozzle is configured to provide for a non-uniform delivery of the reagent across the reagent nozzle. In particular, some parts, portions, locations or areas of the reagent nozzle are configured to deliver more reagent than others. This enables the flow rate or the amount of reagent delivered at different locations within the combustion chamber to be selected to match the flow rates or amounts of effluent stream at those locations within the combustion chamber. For example, some inlet nozzles deliver the effluent stream into the combustion chamber in non-uniform flow rates or amounts. In particular, the flow rates of effluent stream delivered by the inlet nozzle at some positions within the combustion chamber can be higher than at other positions. The reagent nozzle can therefore be configured to deliver a greater flow of reagent proximate those regions which have a greater flow of effluent stream compared to the flow of reagent provided proximate regions of lower effluent stream flow. This enables the amount of reagent used to be optimized, since otherwise a uniform flow of reagent may be required to match the highest flow of the effluent stream which results in an over-supply of the reagent in order to achieve a required abatement performance. By using this approach, the abatement performance can be maintained with a reduced supply of reagent.

Inlet Assembly—1$^{st}$ Arrangement

Figure 1:
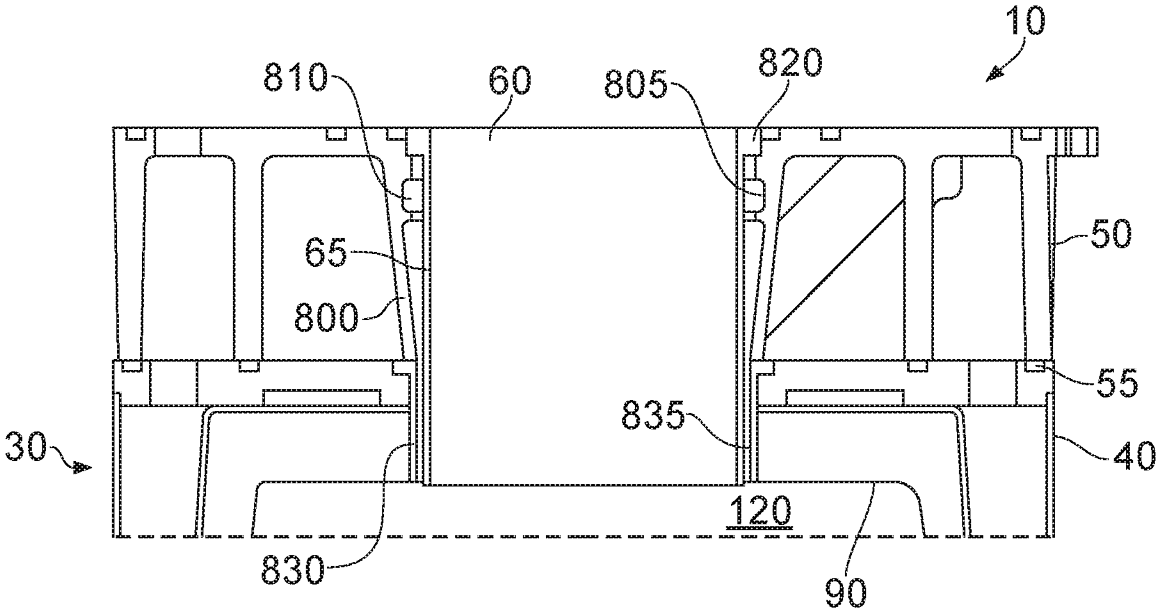
FIG. 1 is a cross-section through an inlet assembly for an abatement apparatus according to one embodiment.

FIG. 1 is a cross-section through an inlet assembly for an abatement apparatus 10 according to one embodiment. A mount 50 is provided which attaches on its downstream surface 55 with a housing 40 of a combustion chamber module 30. The combustion chamber module 30 contains a foraminous sleeve 90 housed within the housing 40. A foraminous sleeve 90 within the housing 40 defines a combustion chamber 120. The mount 50 has a wall 800 which defines an inlet aperture which receives an effluent stream inlet 60. In this embodiment, the effluent stream inlet 60 has an obround cross-section. However, it will be appreciated that other shape effluent stream inlets 60 are possible, such as those with circular or other cross-sections. A gallery 810 is formed between a radially outer surface 65 of the effluent stream inlet 60 and a radially inner surface 805 of the wall 800. The housing 40 defines an aperture in its upstream surface which receives a reagent nozzle 830. As will be explained in more detail below, a radially inner surface 835 of the reagent nozzle 830 is spaced away from the radially outer surface 65 of the effluent stream inlet 60.

Figure 2:
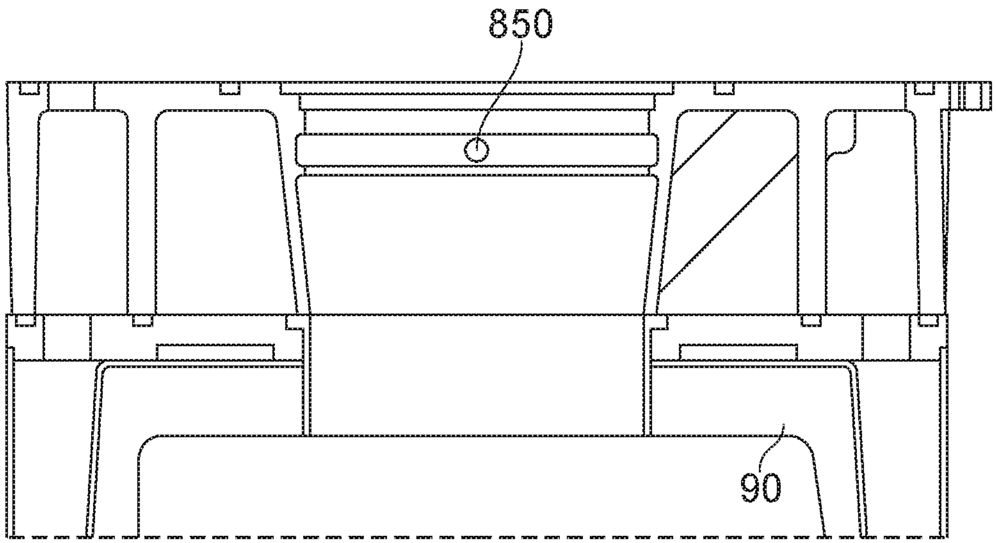
FIG. 2 illustrates the inlet assembly with the effluent stream inlet removed.

FIG. 2 illustrates the inlet assembly with the effluent stream inlet 60 removed. As can be seen, a reagent inlet 850 is provided which supplies reagent into the gallery 810. Although in this embodiment a single reagent inlet 850 is provided, it will be appreciated that more than one reagent inlet and reagent inlets 850 of different shape are envisaged.

Returning now to FIG. 1, a radially extending flange 820 provided towards an upstream end of the effluent stream 60 cooperates with the mount 50 to fluidly seal the upstream end of the gallery 810. Hence, reagent supplied through the reagent inlet 50 flows into the gallery 810 and travels towards the reagent nozzle 830. The reagent travels between the radially inner surface 835 of the reagent nozzle 830 and the radially outer surface 65 of the effluent stream inlet 60 and discharges into the combustion chamber 120, surrounding the effluent stream discharging from the effluent stream inlet 60.

Figure 3:
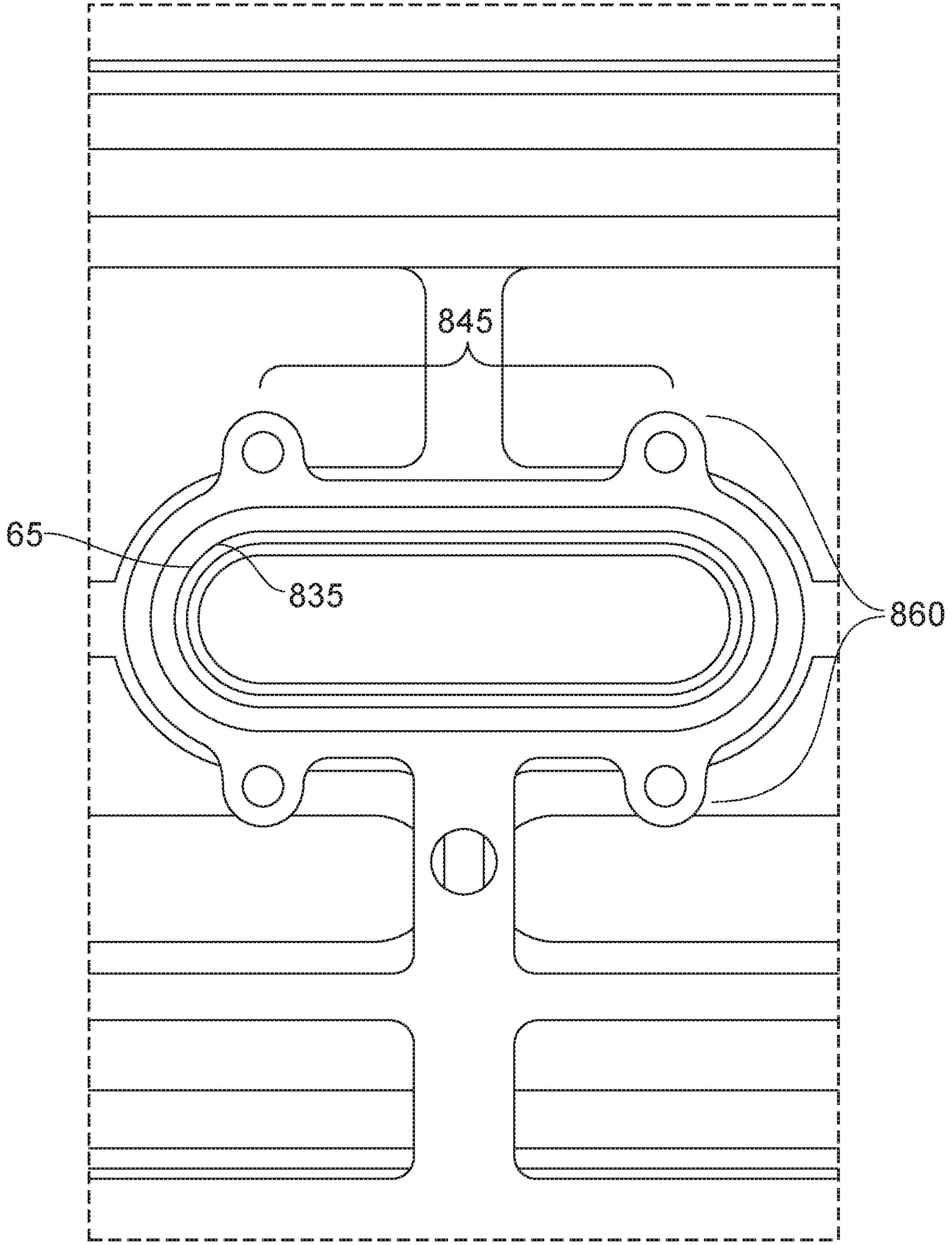
FIG. 3 is a sectional view showing the clearance between the effluent stream inlet and the reagent nozzle in more detail.

FIG. 3 is a sectional view showing the clearance between the effluent stream inlet 60 and the reagent nozzle 830 in more detail. As can be seen, the clearance between the radially inner surface 835 of the reagent nozzle 830 and the radially outer surface 65 of the effluent stream inlet 60 differs at different locations around the reagent nozzle 830. In particular, along linear perimeter regions 845 of the reagent nozzle 830, the distance between the radially inner surface 835 and the radially outer surface 65 is smaller than along curved perimeter regions 860. This causes more reagent to be delivered at the curved perimeter regions 860 than at the linear perimeter regions 845. This means that more reagent is present proximate the curved perimeter regions 860 than proximate the linear portion perimeter 850, which matches the requirement of the effluent stream which tends to split generally into two flows exiting the effluent stream inlet 60, towards its two ends near the curved perimeter regions 860. Less effluent stream is present towards the middle part of the effluent stream inlet 60 in the linear region, and so less reagent is supplied at that location.

Inlet Assembly—2$^{nd}$ Arrangement

Figure 4A:
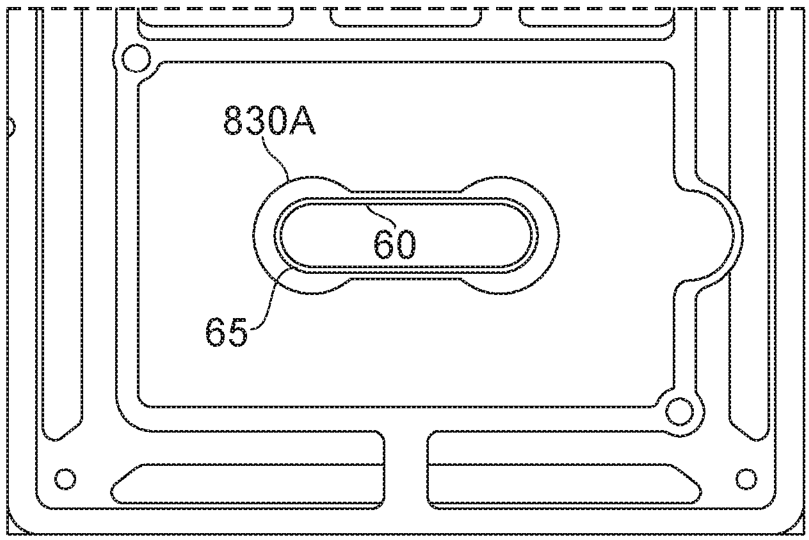
FIG. 4 illustrates a top-sectional view (A) and a side-sectional view (B) of an inlet assembly of an abatement apparatus, according to one embodiment.
Figure 4B:
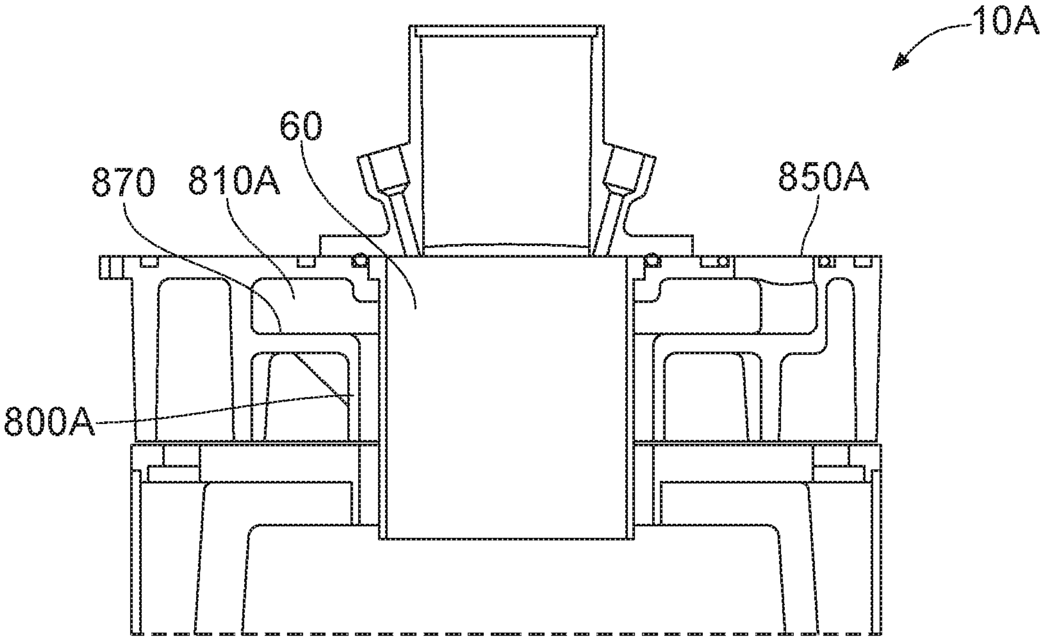

FIG. 4 illustrates a top-sectional view (A) and a side-sectional view (B) of an inlet assembly of an abatement apparatus 10A, according to one embodiment. This arrangement is similar to that shown above but has a gallery 810A supplied from a reagent inlet 850A. Walls 800A extend from a floor 870 to surround the effluent stream inlet 60. As can best be seen in FIG. 4A, the available volume of the reagent nozzle 830A is larger in the vicinity of the curved portions of the effluent stream inlet 60 compared to the linear portions of the effluent stream inlet 60. This helps to supply a greater amount of reagent at the curved portions, in the vicinity of the two main flows of the effluent stream as it exits the effluent stream inlet 60 into the combustion chamber 120A.

This arrangement is particularly suited to some semiconductor manufacturing process exhausts requiring abatement which contain high flows of hydrogen. Examples include epitaxial and polycrystalline silicon growth using either silane or dichlorosilane as the silicon source. Hydrogen flows may be of the order of 50 to 200 l/min per inlet. To aid the combustion of this hydrogen, additional air is supplied by the reagent nozzle 830A around the effluent stream inlet 60. Due to the shape of the effluent stream inlet 60 and the effect this has on the flow of the effluent stream, the reagent nozzle 830A is shaped to form a passage such that the flow distribution of the reagent is non-uniform, giving more flow at either end and less in the middle. This matches the flow pattern of effluent stream discharging from the distal end of the effluent stream inlet 60.

Inlet Assembly—3rd Arrangement

Figure 5:
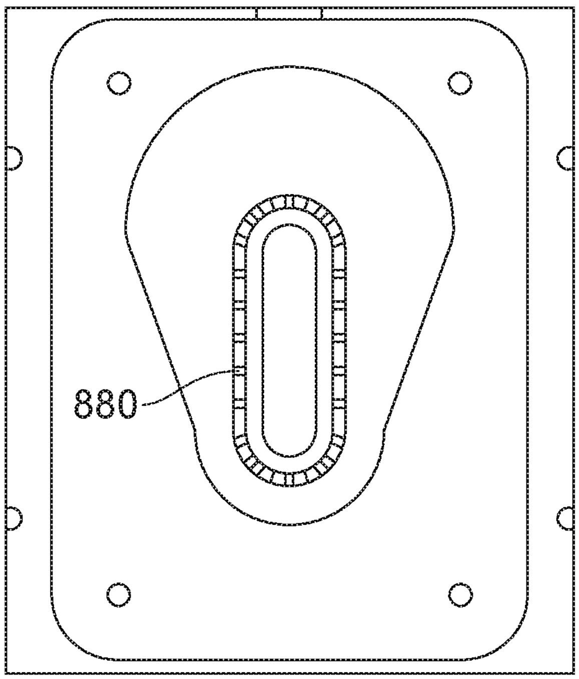
FIGS. 5 and 6 illustrate an arrangement of an inlet assembly of an abatement apparatus with the effluent stream inlet removed.
Figure 6:
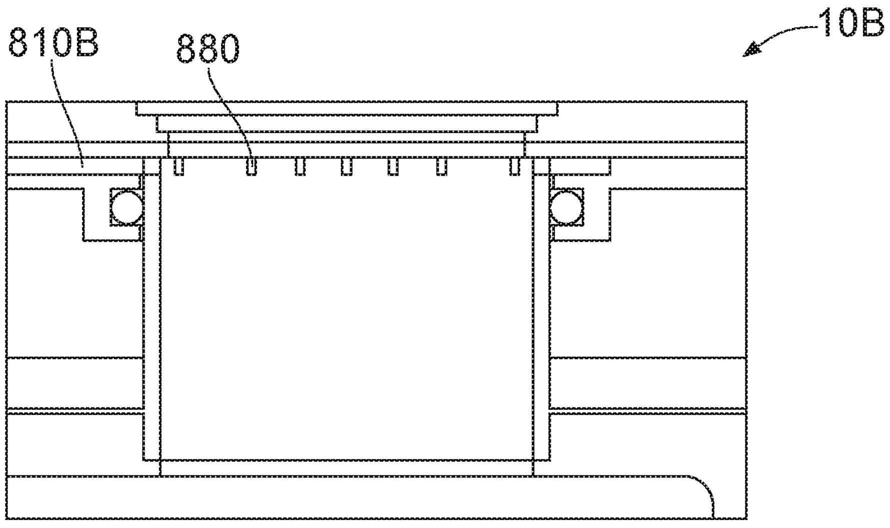

FIGS. 5 and 6 illustrate an arrangement of an inlet assembly of an abatement apparatus 10B with the effluent stream inlet 60 removed. Radially extending apertures 880 are provided which communicate with a gallery 810B which supplies the reagent. The reagent passes from the gallery 810B through the apertures 880 to surround the effluent stream inlet 60 (not shown). The size, location and density of the apertures 880 can be varied to vary the amount of reagent delivered at different positions around the periphery of the effluent stream inlet 60.

A similar effect can be achieved by providing a material with a varying porosity in fluid communication with the supply of the reagent and through which the reagent passes into the reagent nozzle.

Slot nozzle structures for abatement systems may comprise an inner nozzle and an outer nozzle with a gap in between. This gap can be used to supply reagent gases such as fuel, oxygen. It may also be used to supply an inert purge gas.

Hence, it can be seen that gases are supplied to the internal space between two obround nozzles via a port. Flow distribution means are provided to distribute the flow. In one embodiment, the gas flows into a gallery around the top of the outer nozzle. Notches may be cut in the top of the outer nozzle, through which the gas passes. The separate streams from the notches merge and coalesce to give uniform flow at the distal end of the internal space between the nozzles.

In one embodiment, the gas is supplied through a port in the sidewall of the outer nozzle. A septum below this port forms a gallery. An aperture cut in the septum allows the inner nozzle to pass through. The difference between the profiles of the aperture and the outside of the inner nozzle give a shaped passage through which the gas is distributed. This passage may be uniform or non-uniform. A non-uniform passage may be advantageous as it can shape the flow distribution giving, for example, more flow towards the axes and less in the centre, matching the discharge of process gas from the inner nozzle.

It will be appreciated that other aperture shapes are possible such as, for example, a concentric dog-bone shape, an eccentric dog-bone shape and a ∞-shape, etc.

Although illustrative embodiments of the invention have been disclosed in detail herein, with reference to the accompanying drawings, it is understood that the invention is not limited to the precise embodiment and that various changes and modifications can be effected therein by one skilled in the art without departing from the scope of the invention as defined by the appended claims and their equivalents.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. An inlet assembly for an abatement apparatus for treating an effluent stream from a semiconductor processing tool, said inlet assembly comprising:

an inlet nozzle configured to deliver said effluent stream into a combustion chamber of said abatement apparatus; and a reagent nozzle configured to deliver a reagent into said combustion chamber of said abatement apparatus, said reagent nozzle being located concentrically with respect to said inlet nozzle, said reagent nozzle being configured to deliver said reagent in different quantities at different positions around its perimeter;

wherein said inlet nozzle has an obround cross-section and said reagent nozzle has an annular obround cross-section and said reagent nozzle is configured to deliver more of said reagent within a vicinity of a circular portion of said annular obround than within a linear portion of said annular obround.

2. The inlet assembly of claim 1, wherein said inlet nozzle and said reagent nozzle are configured to deliver said reagent into said combustion chamber concentrically with respect to said effluent stream.

3. The inlet assembly of claim 1, comprising an upstream gallery configured to feed said perimeter of the reagent nozzle with said reagent.

4. The inlet assembly of claim 1, wherein said inlet nozzle and said reagent nozzle are configured to deliver said reagent into said combustion chamber, surrounding said effluent stream.

5. The inlet assembly of claim 1, wherein an inner surface of said reagent nozzle is spaced away from an outer surface of said inlet nozzle and a clearance distance between said inner surface of said reagent nozzle and said outer surface of said inlet nozzle differs around said perimeter to deliver said reagent in different quantities at different positions around said perimeter.

6. The inlet assembly of claim 5, wherein said clearance distance is at least one of:

greater at positions which require more of said reagent to be delivered than at positions which require less of said reagent to be delivered; and greater within a vicinity of a circular portion of said annular obround than within a linear portion of said annular obround.

7. The inlet assembly of claim 1, wherein said reagent is supplied to said reagent nozzle via apertures positioned around said perimeter configured to deliver said reagent in different quantities at different positions around said perimeter.

8. The inlet assembly of claim 7, wherein said apertures extend radially.

9. The inlet assembly of claim 7, wherein at least one of a size and a density of said apertures differs at different positions around said perimeter.

10. The inlet assembly of claim 7, wherein at least one of a size and a density of said apertures is at least one of:

greater at positions which require more of said reagent to be delivered than at positions which require less of said reagent to be delivered; and greater within a vicinity of a circular portion of an annular obround than within a linear portion of said annular obround.

11. The inlet assembly of claim 1, wherein said reagent is supplied to said reagent nozzle via a porous material positioned around said perimeter, said porous material having differing porosities to deliver said reagent in different quantities at different positions around said perimeter.

12. An abatement apparatus comprising the inlet assembly of claim 1.

13. A method, comprising:

delivering an effluent stream into a combustion chamber of an abatement apparatus with an inlet nozzle that has an obround cross-section;

locating a reagent nozzle concentrically with respect to said inlet nozzle;

configuring said reagent nozzle such that said reagent nozzle has an annular obround cross-section and said reagent nozzle is configured to deliver more of a reagent within a vicinity of a circular portion of said annular obround than within a linear portion of said annular obround so that the reagent nozzle to delivers the reagent in different quantities at different positions around its perimeter.

14. An inlet assembly for an abatement apparatus for treating an effluent stream from a semiconductor processing tool, said inlet assembly comprising:

an inlet nozzle configured to deliver said effluent stream into a combustion chamber of said abatement apparatus; and a reagent nozzle configured to deliver a reagent into said combustion chamber of said abatement apparatus, said reagent nozzle being located concentrically with respect to said inlet nozzle, said reagent nozzle being configured to deliver said reagent in different quantities at different positions around its perimeter;

wherein said reagent is supplied to said reagent nozzle via a porous material positioned around said perimeter, said porous material having differing porosities to deliver said reagent in different quantities at different positions around said perimeter.

* * * * *